(12) United States Patent
Maekawa et al.

(10) Patent No.: US 8,505,510 B2
(45) Date of Patent: Aug. 13, 2013

(54) SLIDING MEMBER AND SURFACE TREATMENT METHOD FOR THE SAME

(75) Inventors: Keiichi Maekawa, Wako (JP); Atsushi Murakami, Wako (JP); Takaaki Harasaki, Toyama (JP)

(73) Assignees: Honda Motor Co., Ltd, Tokyo (JP); Tanaka Seimitsu Kogyo Co., Ltd., Toyama-shi (JP)

( * ) Notice: Subject to any disclaimer, the term of this patent is extended or adjusted under 35 U.S.C. 154(b) by 229 days.

(21) Appl. No.: 12/863,345

(22) PCT Filed: Jan. 15, 2009

(86) PCT No.: PCT/JP2009/000123
§ 371 (c)(1),
(2), (4) Date: Jul. 16, 2010

(87) PCT Pub. No.: WO2009/096143
PCT Pub. Date: Aug. 6, 2009

(65) Prior Publication Data
US 2011/0114045 A1    May 19, 2011

(30) Foreign Application Priority Data
Jan. 31, 2008  (JP) ................. 2008-022082

(51) Int. Cl.
*F01L 1/14*  (2006.01)
(52) U.S. Cl.
USPC ............. 123/90.51; 123/90.52; 123/90.48

(58) Field of Classification Search
USPC ............... 123/90.51, 90.52, 90.48
See application file for complete search history.

(56) References Cited

U.S. PATENT DOCUMENTS

| | | | |
|---|---|---|---|
| 4,909,198 A * | 3/1990 | Shiraya et al. ............. 123/90.51 |
| 6,752,708 B1 | 6/2004 | Kinoshita et al. |
| 2002/0162523 A1 | 11/2002 | Ishihara |
| 2008/0276753 A1 | 11/2008 | Takamura |

FOREIGN PATENT DOCUMENTS

| | | | |
|---|---|---|---|
| JP | 64-021098 A | 1/1989 |
| JP | 05-179421 A | 7/1993 |
| JP | 6-235096 A | 8/1994 |
| JP | 3167227 B2 | 3/2001 |
| JP | 2001-158689 A | 6/2001 |
| JP | 2002-266983 A | 9/2002 |
| JP | 2004-183075 A | 7/2004 |
| JP | 2006-214314 A | 8/2006 |
| WO | 03/025233 A1 | 3/2003 |

OTHER PUBLICATIONS

Machine Translation of JP 6-235096 A; Aug. 1994.*

(Continued)

*Primary Examiner* — Zelalem Eshete
(74) *Attorney, Agent, or Firm* — Westerman, Hattori, Daniels & Adrian, LLP (57) ABSTRACT

Abrasion resistance is further enhanced in a sliding member used in an internal combustion engine.
With respect to a valve lifter 6 used in an internal combustion engine 100, hard particles having higher hardness than the valve lifter 6 are dispersed onto the top face 61 of the valve lifter 6, and a nitriding treatment is conducted on the top face 61 dispersed with the hard particles.

8 Claims, 8 Drawing Sheets

(56) References Cited

OTHER PUBLICATIONS

Notification of Transmittal Translation of the International Preliminary Report on Patentability (Form PCT/IB/338) of International Application No. PCT/JP2009/000123 mailed Sep. 16, 2010 with Form PCT/IPEA/409.

Supplementary European Search Report dated Feb. 9, 2012, issued in corresponding European Patent Application No. 09705288.0.
International Search Report of PCT/JP2009/000123, Mailing Date of Apr. 14, 2009.

\* cited by examiner

SLIDING MEMBER AND SURFACE TREATMENT METHOD FOR THE SAME

TECHNICAL FIELD

The present invention relates to a sliding member used for an internal combustion engine, and a surface treatment method for the sliding member.

BACKGROUND ART

Out of members used in an internal combustion engine, a sliding member sliding with another member under operation of the internal combustion engine is required to have high abrasion resistance. Therefore, there has been hitherto known an internal combustion engine in which a surface sliding with another member is subjected to a special surface treatment to enhance the abrasion resistance (for example, see Patent Document 1).
Patent Document 1: JP-A-2002-266983

DISCLOSURE OF THE INVENTION

Problem to be Solved by the Invention

Sliding members have been recently used under a high-load environment in internal combustion engines which have been developed to further increase power and rotational speed. Therefore, the sliding members are required to be further enhanced in abrasion resistance.

Therefore, the present invention has an object to enhance abrasion resistance in sliding members used in internal combustion engines, etc. which are increased in power and rotational speed.

Means of Solving the Problem

In order to attain the above object, according to the present invention, a sliding member used in an internal combustion engine is characterized in that hard particles having higher hardness than the sliding member are dispersed on the surface of the sliding member and the surface dispersed with the hard particles is subjected to a nitriding treatment.

According to this construction, the surface dispersed with the hard particles is subjected to the nitriding treatment, whereby a nitride layer containing the hard particles is formed on the surface. The nitride layer is increased in abrasion resistance because base material of the sliding member is nitrided, and further the abrasion resistance is further enhanced because the hard particles are contained. Accordingly, the nitride layer having the high abrasion resistance is formed on the sliding member, whereby the abrasion resistance of the sliding member can be enhanced.

In the above construction, the hard particles may be particles of aluminum oxide.

In this case, the hard particles of aluminum oxide dispersed on the surface of the sliding member have good chemistry with the nitriding treatment, and thus the hard particles are easily contained in the nitride layer generated through the nitriding treatment. Therefore, the nitride layer which is enhanced in abrasion resistance because it contains the hard particles can be easily formed on the surface of the sliding member, thereby enhancing the abrasion resistance of the sliding member. Furthermore, the particles of aluminum oxide are high in hardness and low in cost, and thus there is an advantage that the cost can be reduced and the abrasion resistance can be enhanced.

In the above construction, the hard particles may be particles having a particle diameter of 10 μm (micrometer) or less.

In this case, the particle diameter of the hard particles contained in the nitride layer is small, and unevenness of the surface of the nitride layer is suppressed, and frictional loss on the surface which is subjected to the nitriding treatment can be reduced.

Furthermore, in the above construction, the hard particles may be dispersed on the surface so that the density of the hard particles on the surface is equal to at least 5%, and subjected to the nitriding treatment.

In this case, a sufficient amount of hard particles can be contained in the nitride layer, and thus the abrasion resistance of the nitride layer can be enhanced.

In the above construction, the sliding surface of the sliding member with another member may be polished by the hard particles, and further subjected to the nitriding treatment.

In this case, a sliding surface of the sliding member with the other member is polished by the hard particles, whereby the surface roughness of the sliding surface is smoothed, and the frictional loss on the sliding surface can be reduced. Furthermore, when polishing is executed by the hard particles, the hard particles impinge against or bite into the sliding surface of the sliding member, whereby recesses are formed on the sliding surface. The recesses function as oil pits when the siding member is installed in the internal combustion engine. As described above, the oil pits can be formed in a polishing step of smoothing the sliding surface of the sliding member, and thus a step of forming oil pits is not separately required. Therefore, there is an advantage that the number of steps can be reduced.

Furthermore, in the above construction, the sliding member may be a valve lifter which slides with another member in an internal combustion engine to open/close an engine valve.

In this case, a nitride layer having excellent abrasion resistance is formed on the surface of a valve lifter to which a high load is imposed in an internal combustion engine which has been recently further increased in power and rotational speed, whereby the abrasion resistance of the valve lifter can be enhanced.

Furthermore, in order to attain the above object, the surface treatment method of the sliding member according to the present invention which is used for an internal combustion engine is characterized by comprising: a step of dispersing hard particles having higher hardness than the sliding member on the surface of the sliding member; and a step of conducting a nitriding treatment on the surface on which the hard particles are dispersed.

According to this method, the nitriding treatment is conducted on the surface on which the hard particles are dispersed, whereby a nitride layer containing the hard particles is formed on the surface. The nitride layer is enhanced in abrasion resistance because the base material of the sliding member is nitrided, and further it is further enhanced because it contains the hard particles. Accordingly, the nitride layer having high abrasion resistance can be formed on the sliding member, and the abrasion resistance of the sliding member can be enhanced.

In the above construction, the sliding member may be a valve lifter which slides with another member in the internal combustion engine to open/close an engine valve, and the step of dispersing the hard particles on the surface of the sliding member may contain a step of polishing the sliding surface sliding with the other member with the hard particles.

In this case, the abrasion resistance of a valve lifter to which a high load is applied in an internal combustion engine which has been recently developed to further increase in power and rotational speed can be enhanced. Furthermore, in the step of dispersing the hard particles on the sliding surface between the valve lifter and the other member, the sliding surface is polished by the hard particles, so that the surface roughness of the sliding surface can be smoothed, the abrasion loss on the sliding surface can be reduced and the hard particles can be efficiently dispersed on the sliding surface. When the polishing is executed by the hard particles, the hard particles impinge against or bite into the sliding surface of the valve lifter to form recesses on the sliding surface of the valve lifter, and the recesses function as oil pits when the sliding member is installed in the internal combustion engine. Accordingly, in the polishing step, the sliding surface of the valve lifter is smoothed and the oil pits are formed. Accordingly, it is not required to separately provide a step of forming oil pits, and thus the number of processing steps can be reduced.

Effect of the Invention

According to the present invention, the nitriding treatment is conducted on the surface on which the hard particles are dispersed, whereby the nitride layer which contains the hard particles and has high abrasion resistance is formed on the surface of the sliding member, and thus the abrasion resistance of the sliding member can be enhanced. Furthermore, as the hard particles are used particles of aluminum oxide which has good chemistry with the nitriding treatment. Therefore, the hard particles can be easily contained in the nitride layer generated in the nitriding treatment, and the nitriding layer which sufficiently contains the hard particles can be easily generated on the surface of the sliding member. Furthermore, the abrasion resistance of the surface of the sliding member can be enhanced while suppressing increase of the cost. Furthermore, the particle diameter of the hard particles is set to 10 μm or less, whereby unevenness of the nitriding layer can be suppressed and the frictional loss of the surface which is subjected to the nitriding treatment can be reduced. Furthermore, the hard particles are dispersed on the surface of the sliding member so that the density of the hard particles on the surface occupies at least 5%, whereby a sufficient amount of hard particles can be contained in the nitride layer, and the abrasion resistance of the nitride layer can be enhanced.

Furthermore, the sliding surface between the sliding member and another member is polished by the hard particles, and also the nitriding treatment is conducted, whereby the surface roughness of the sliding surface can be smoothed and the frictional loss on the sliding surface can be reduced. In addition, when polishing is executed, recesses functioning as oil pits can be formed on the sliding surface of the sliding member by the hard particles, and thus the number of processing steps can be reduced. Furthermore, when the sliding member is a valve lifter which slides with another member in an internal combustion engine to open/close the engine valve, a nitride layer having an excellent abrasion resistance is formed on the surface of a valve lifter to which a high load is applied in an internal combustion engine which has been recently developed to further increase in power and rotational speed, whereby the abrasion resistance of the valve lifter can be enhanced.

BRIEF DESCRIPTION OF THE DRAWINGS

FIG. 3 is a schematic diagram showing an example of a surface state of a valve lifter according to a first embodiment, wherein

FIG. 4 is a schematic diagram showing an example of as surface state of the valve lifter according to the first embodiment, wherein

FIG. 5 is a graph showing abrasion resistance obtained through the surface treatment of the first embodiment, wherein

FIG. 6 is a schematic diagram showing the surface state of a valve lifter according to a second embodiment, wherein

FIG. 7 schematically shows the surface state of a valve lifter according to a third embodiment, wherein

FIG. 8 schematically shows the surface state of the valve lifter according to the third embodiment, wherein

DESCRIPTION OF REFERENCE NUMERALS 3 air intake valve (engine valve)
4 exhaust valve (engine valve)
5 valve operating device
6 valve lifter (sliding member)
7 cam shaft
61 top face
70 air intake cam
100 internal combustion engine
101 projecting portion
102 recess portion
103 flat surface
104 recess portion
122 hard particles
131 nitride layer

BEST MODES FOR CARRYING OUT THE INVENTION

Preferred embodiments according to the present invention will be described hereunder with reference to the accompanying drawings.

First Embodiment

Figure 1:
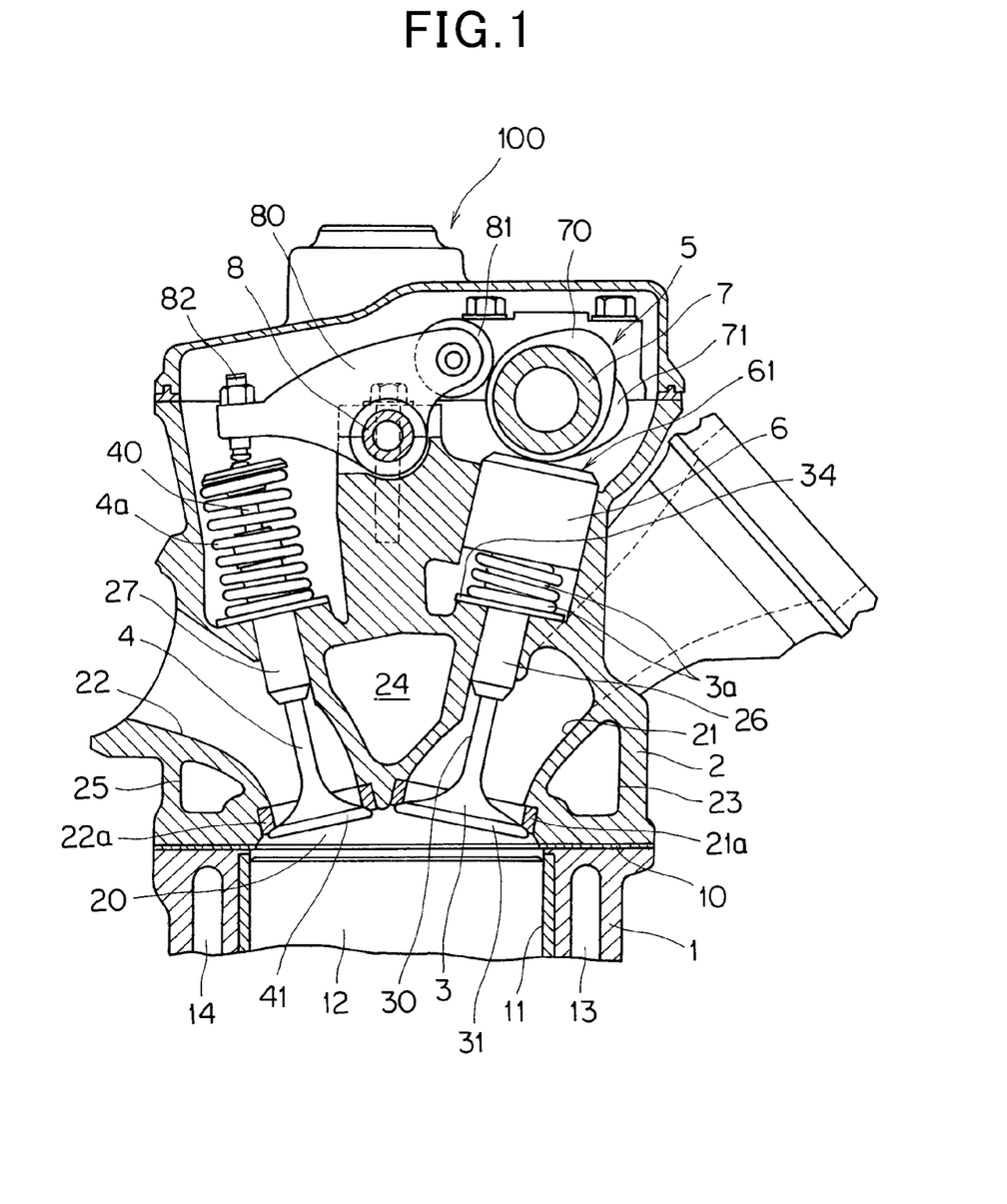
FIG. 1 is a cross-sectional view showing an example of an internal combustion engine according to the present invention.

FIG. 1 is a cross-sectional view showing an example of an internal combustion engine 100 according to an embodiment. The internal combustion engine 100 according to the embodiment has a cylinder block 1, and a cylinder head 2 secured to the cylinder block 1 through a head gasket 10.

A cylinder 11 is formed in the cylinder block 1, a piston 12 which is fitted in the cylinder 11 so as to be slidable upward and downward, and the piston 12 is continuously joined to a crank shaft (not shown) which is supported through a shaft on the cylinder block 1 so as to be freely rotatable. Water jackets 13 and 14 for making cooling water flow to cool the cylinder block 1 are formed on the cylinder block 1 so as to surround the piston 1.

The cylinder head 2 is provided with a combustion chamber 20 at the upper portion of the cylinder 11, and also provided with an air intake port 21 and an exhaust port 22 which intercommunicate with the combustion chamber 20. The air intake port 21 and the exhaust port 22 are opened and closed by an air intake valve 3 and an exhaust valve 4 respective as described later. In the internal combustion engine 100, air-fuel mixture containing mixture of fuel and air sucked from the air intake port 21 is compressed in the combustion chamber 20 formed between the piston 12 and the cylinder head 2, and ignited by an ignition plug (not shown) to be combusted. The combustion pressure pushes the piston 12 downward, and the push pressure rotationally drives the crank shaft. After the combustion, the piston 12 is upwardly moved by the rotation of the crank shaft under the state that the exhaust port 22 is opened by the exhaust valve 4, thereby compressing the combustion chamber 20 between the piston 12 and the cylinder head 2, whereby exhaust gas is discharged from the combustion chamber 20 to the exhaust port 22.

Water jackets 23, 24 and 25 for cooling the cylinder head 2 are formed in the cylinder head 2 so as to surround the air intake port 21 and the exhaust port 22. These water jackets 23, 24 and 25 serve as flow paths through which cooling liquid flows into the cylinder head 2.

The air intake valve 3 (engine valve) for opening/closing the air intake port 21 is disposed in the cylinder head 2 so as to be urged by a valve spring 3a in a direction along which the air intake port 21 is closed (valve closing direction), and the exhaust valve 4 (engine valve) for opening/closing the exhaust port 22 is disposed in the cylinder head 2 so as to be urged by a valve spring 4a in a direction along which the exhaust port 22 is closed (valve closing direction).

The air intake valve 3 has a round rod-like stem 30 and a substantially conical umbrella portion 31 which is integrally formed at the top of the stem 30. The air intake valve 3 is disposed in a substantially cylindrical valve guide 26 engagedly fitted in the cylinder head 2 so as to project to some midpoint of the air intake port 21 so that the stem 30 thereof penetrates through the valve guide 26, whereby the air intake valve 3 is supported freely slidably by the valve guide 26. The upper portion of the valve spring 3a and a cylindrical valve lifter 6 having a bottom (sliding member) are covered on the top portion of the stem 30, and the upper portion of the stem 30 is brought into contact with the cam shaft 7 through the valve lifter 6.

The exhaust valve 4 has a rounded rod-like stem 40 and a substantially conical umbrella portion 41 formed integrally at the tip of the stem 40 as in the case of the air intake valve 3. The exhaust valve 4 is disposed in a substantially cylindrical valve guide 27 engagedly fitted in the cylinder head 2 so as to project to some midpoint of the exhaust port 22 so that the stem 40 thereof penetrates through the valve guide 26, whereby the exhaust valve 4 is supported freely slidably by the valve guide 27. A valve sprint 4a is mounted on the stem 40, and the end portion of a locker arm 80 described later abuts against the top portion of the stem 40.

Ring-shaped valve seals 21a and 22a are arranged at the combustion chamber 20 side of the air intake port 21 and the exhaust port 22 respectively. When the air intake valve 3 is closed, the outer peripheral edge portion of the umbrella portion 31 of the air intake valve 3 and the valve seal 21a form a seal face to thereby close the air intake port 21. Furthermore, when the exhaust valve 4 is closed, the outer peripheral edge portion of the umbrella portion 41 of the exhaust valve 4 and the valve seal 22a form a seal face, thereby closing the exhaust port 22.

The internal combustion engine 100 has a unicam type valve operating device 5 driven by one cam shaft 7, and the air intake valve 3 and the exhaust valve 4 are opened/closed by the valve operating device 5.

The valve operating device 5 has a cam shaft 7 which is supported through a shaft in the cylinder head at the upper portion of the air intake valve 3 so as to be freely movable, and a locker shaft 8 which has an axial line parallel to the cam shaft 7 and is fixed to the cylinder head 2.

The cam shaft 7 is joined to the crank shaft by a chain power transmission mechanism (not shown), and rotates interlockingly with the crank shaft. The cam shaft 7 is provided with substantially disc-shaped air intake cam 70 and exhaust cam 71, the peripheral surface of the air intake cam 70 is brought into contact with the top face 61 of the valve lifter 6, and the peripheral surface of the exhaust cam 71 is brought into contact with a locker arm 80 which is disposed so as to be freely rotated around the locker shaft 8. When the cam shaft 7 is rotated, the air intake valve 3 moves upward and downward through the valve lifter 6 in accordance with the cross-section (profile) of the air intake cam 70, the exhaust valve 4 moves upward and downward through the locker arm 80 in accordance with the profile of the exhaust cam 71, and the air intake port 21 and the exhaust port 22 are opened at a proper timing.

The locker arm 80 is supported by the locker shaft 8 so as to be freely rotatable. One end of the locker arm 80 is provided with a roller 81 which comes into rolling contact with the exhaust cam 7, and a tappet screw 82 which comes into contact with the top portion of the stem 40 of the exhaust valve 4 is threadedly fitted to the other end of the locker arm 80 so that the forward/backward position can be adjusted. The locker arm 80 rotates around the locker shaft 8 in connection with rotation of the exhaust cam 71, and pushes the exhaust valve 4 through the tappet screw 82, thereby opening/closing the exhaust valve 4.

Figure 2:
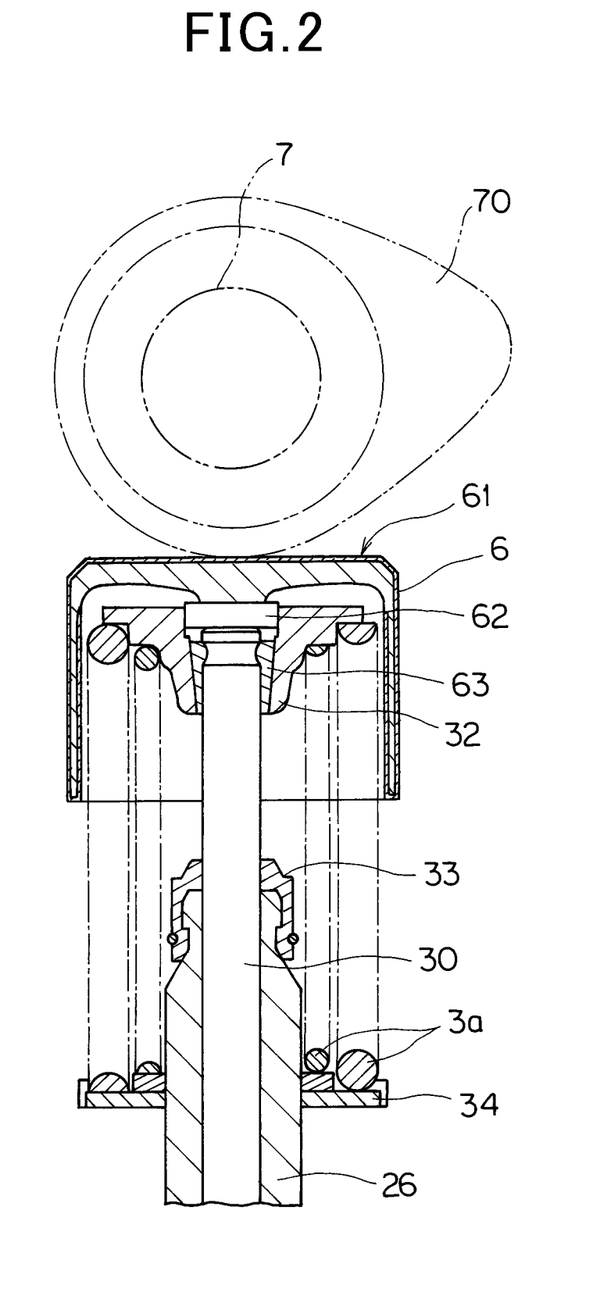
FIG. 2 is a cross-sectional view showing a main part of the construction of a valve lifter and its neighborhood.

FIG. 2 is a cross-sectional view showing a main part of the construction of the valve lifter 6 and its neighborhood.

As shown in FIG. 2, a valve stem seal 33 for keeping air tightness between the stem 30 and the valve guide 26 is disposed at the upper end of the valve guide 26. The valve guide 26 is provided with a spring seat 34 for positioning the lower end of the valve spring 3a. The spring seat 34 is brought into contact with the cylinder head 2 as shown in FIG. 1 to fixedly hold the lower end of the valve spring 3a.

A retainer 32 for holding the upper end of the valve spring 3a is secured to the top portion of the stem 30 through a cotter 63, and the retainer 32 receives the urging force of the valve spring 3a, whereby the air intake valve 3 is urged in the valve closing direction.

A cylindrical valve lifter 6 having a bottom is covered on the top portion of the stem 30 with the bottom surface thereof placed face up, and the top portion of the stem 30 is brought into contact with the inside of the bottom surface of the valve lifter 6 through a shim 62.

As described above, the top face 61 of the valve lifter 6 is brought into contact with the peripheral surface of the air intake cam 70 by the urging force of the valve spring 3a, and when the air intake cam 70 pushes the valve lifter 6 against the urging force of the valve spring 3a in connection with the rotation of the cam shaft 7, the air intake valve 3 is pushed down together with the valve lifter 6, and moved in the valve opening direction. The interval between the valve lifter 6 and the air intake cam 70 is adjustable by changing the thickness of the shim 62. Furthermore, the edge of the top face 61 is chamfered.

During operation of the internal combustion engine 100, the top face 61 of the valve lifter 6 slides with the peripheral surface of the air intake cam 70 at all times. Here, relatively high surface pressure occurs between the top face 61 and the peripheral surface of the air intake cam 70. Therefore, iron or the like which has excellent resistance to surface pressure is used as the material of the top face 61 of the valve lifter 6, and furthermore a surface treatment is conducted on the top face 61 to enhance the abrasion resistance.

Figure 3A:
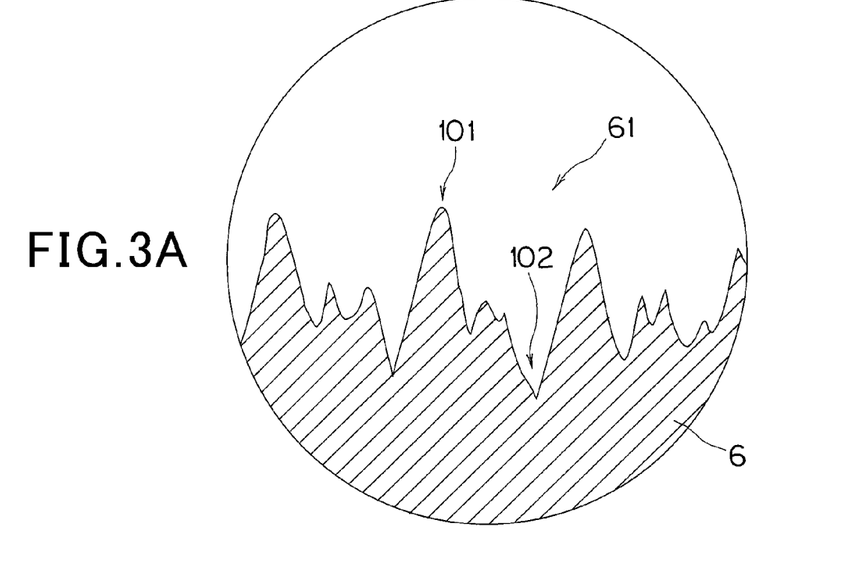
FIG. 3A is an enlarged view showing a surface state before a polishing step.
Figure 3B:
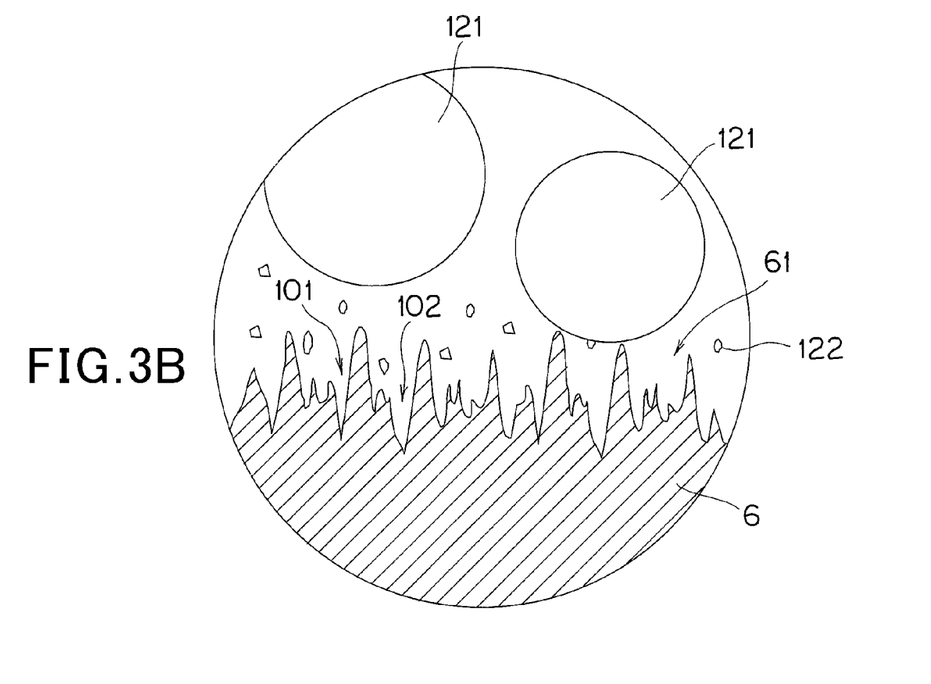
FIG. 3B is an enlarged view showing a surface state in the polishing step.
Figure 4A:
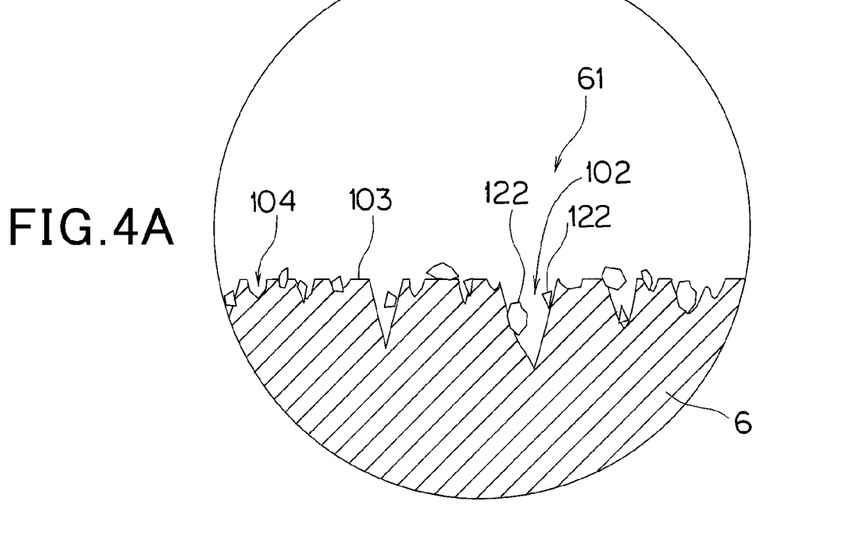
FIG. 4A is an enlarged view showing the surface state after the polishing step.
Figure 4B:
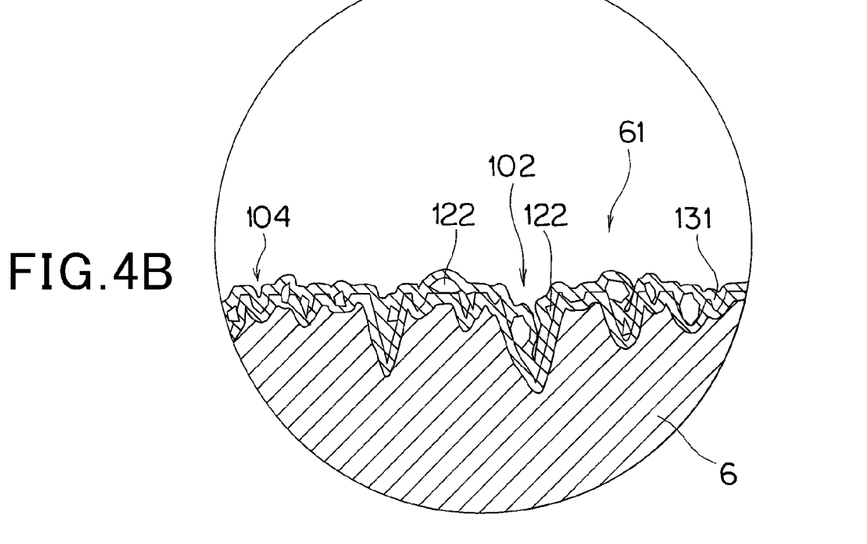
FIG. 4B is an enlarged view showing the surface state after a nitriding treatment.

The surface treatment of the top face 61 will be described. FIGS. 3 and 4 are diagrams schematically showing the surface treatment of the valve lifter 6 according to the first embodiment, FIG. 3A is an enlarged view showing a surface state before a polishing step (first step described later), FIG. 3B is an enlarged view showing the surface state during the polishing step, FIG. 4A is an enlarged view showing the surface state after the polishing step, and FIG. 4B is an enlarged view showing the surface state after a nitriding treatment (second step described later). FIGS. 3 and 4 and FIGS. 6 to 8 described later are greatly enlarged views showing the microstructure on the surface of the top face 61, and a part thereof is schematically diagramed.

The valve lifter 6 is cut out from an iron type material which is formed into a substantially cylindrical shape by casting, forging or drawing process or an iron type material which is formed into a cup-like shape having a bottom by casting or forging. A space in which the stem 30, the valve spring 3a, etc. are mounted is formed by lathe turning, and the top face 61 is processed to be flat by grinding.

As shown in FIG. 3A, the top face 61 after the grinding process becomes a smoothed surface, however, when it is greatly enlarged, existence of projections 101 and recess portions 102 are observed.

The surface treatment of the top face 61 in the first embodiment is executed according to the following procedure.

First step: the top face 61 is polished by using hard particles
Second step: the top face 61 is subjected to the nitriding treatment under the state that the hard particles for polishing adhere.

In the first step, the top face 61 having unevenness as shown in FIG. 3A is polished so as to become a high-level smooth surface. In the first step, hard particles having higher hardness than the base material (for example, the iron type material described above) constituting the top face 61 is used as polishing material. A barrel device, preferably a wet type vibration barrel device may be used as a device of polishing the top surface.

Here, as the material constituting the top face 61, iron, steel, stainless, iron type alloy or the like may be used as material having excellent resistance to surface pressure as described above.

It is desired that the hard particles have higher hardness than the material (base material) constituting the top face 61. Specifically, particles of alumina (aluminum oxide), particles of alumna type ceramic containing other elements or a lot of oxygen in the composition of alumina, particles of zirconia type ceramics, particles of silicon carbide type ceramics may be used. Out of these materials, alumina has sufficiently high hardness and is lower in cost as compared with zirconia, etc., for example. Therefore, alumina is used as dominant material from the viewpoint that desired abrasion resistance can be enhanced without causing great increase of the cost.

When the base material of the top face 61 is a cut-difficult material such as steel having high hardness or the like, superabrasive material such as false diamond, CBN (cubical crystal boron nitride) or the like may be used. Silica (silicon oxide) may be used in accordance with the hardness of the material constituting the top face 61. However, material having higher hardness as described above is preferably used.

The particle diameter of the hard particles is preferably equal to 10 μm or less, and more preferably set to 5 μm or less. The reason for this will be described later. In the first step of the first embodiment, a mixture of two kinds of hard particles different in particle diameter, that is, 1 mm (millimeter) or more in particle size, for example, large hard particles 121 of 3 mm, and small hard particles 122 of 10 μm or less in particle diameter is used.

The measurement of the hard particle diameter may be performed by using a particle size distribution measuring device; produced by Nikkiso Co., Ltd. MICROTRACK HRA 9320-X100.

The hard particles 121 shown in FIG. 3B are spherical particles of about 3 mm in particle diameter, for example. However, the size and shape thereof may be arbitrary, and the particles may have an incisive shape. The contraction scale of FIG. 3B is different from that of FIGS. 3A, 4A and 4B.

During the polishing period in the first step, as shown in FIG. 3B, the projecting portions 101 existing at the top face 61 are scraped by the hard particles 121 and 122, and thus the top face 61 is gradually smoothened. The large hard particles 121 grind the projecting portions 101. In addition, the projecting portions 101 are also ground by the hard particles 122 having the small particle size in the first step, and the top face 61 is trimmed to be flat. Furthermore, during polishing shown in FIG. 3B, the hard particles 122 are pushed into the top face 61 by the hard particles 121, etc., so that the hard particles 122 bite into the top face 61.

After the polishing of the first step, as shown in FIG. 4A, the projecting portions 101 (FIG. 3A, FIG. 3B) existing on the surface of the top face 61 are scraped and thus a flat surface 103 is formed.

Furthermore, many hard particles 122 (10 μm or less) used for polishing or many hard particles 122 (10 μm or less) occurring due to impingement of the respective hard particles for polishing are disposed on the surface of the top face 61, and adhere to the whole top face 61 containing the insides of the recess portions 102, the flat surface 103, etc. The hard particles 122 contain hard particles smaller than 10 μm in particle diameter (for example, particles having the particle diameter of 5 μm or less, or the particle diameter of 1 to 2 μm) generated by the impingement of the respective hard particles.

The hard particles shown in FIG. 4A are incisive particles, however, most of particles excellent in cutting power such as alumina or the like have incise shapes as shown in FIG. 4A. Therefore, some hard particles 122 bite into the surface layer of the top face 61.

Furthermore, recess portions 104 which do not exist before the first step may occur on the surface of the top face 61. These recess portions 104 occur when the hard particles 122 impinge during polishing or when the hard particles 122 biting into the top face 61 during polishing drop out during polishing or after polishing. As described above, in addition to the recess portions 102 existing before the first step, recess portions 104 are newly formed at places where the projection portions 101 exist in the first step, and thus many small recesses exist on the surface of the top face 61.

These recess portions 102 and 104 on the top face 61 function as oil pool (oil pits) for holding lubricating oil when the valve lifter 6 is installed in the internal combustion engine 100, and thus they are useful.

The top face 61 of the valve lifter 6 slides with the peripheral surface of the air intake cam 70 (FIG. 2) at high speed. Therefore, oil is supplied from the external during operation and this oil forms oil film on the top face 61 to lubricate the top face 61 and the peripheral surface of the air intake cam 70. The recess portions 102 and 104 described above function as oil pits, so that high oil holding force is exercised on the top face 61 and the top face 61 and the peripheral surface of the air intake cam 70 are lubricated.

As described above, in the first step, the recess portions 104 are formed in addition to the recession portions 102 which have existed from the first. As a result, the main recess portions 102 and 104 functioning as oil pits are provided on the top face 61, and high oil holding force is exercised. Therefore, the valve lifter 6 and the air intake cam 70 can be lubricated. Furthermore, the oil pits are formed when the top face 61 is polished in the first step, and thus there is an advantage that a processing for forming oil pits separately is unnecessary and the number of processing steps can be reduced.

In a subsequent second step, under the state that the hard particles 122 adhere to the top face 61 as shown in FIG. 4A, the nitriding treatment is conducted. This nitriding treatment is executed by a gas nitriding method, a gas soft nitriding method, a salt bath nitriding method, an ion nitriding method or the like, however, a specific method may be determined in accordance with the type of the base material constituting the top face 61 or the like. It is preferable as an example of the nitriding treatment to using a gas soft nitriding furnace as a nitriding treatment device and executes low-temperature soft nitriding.

As shown in FIG. 4B, a nitriding layer 131 is formed on the surface layer of the top face 61 as shown in FIG. 4B. The nitriding layer 131 is a layer containing as main components iron nitride generated by nitriding the base material (the iron type material described above) constituting the top face 61 or nitride of other elements containing in the base material of the valve lifter 6. The nitride layer 131 is formed in the direction from the surface layer of the top face 61 to the inside of the base material, grows to the outside of the surface layer of the top face 61, and wraps at least some of the hard particles 122. Therefore, after the nitriding treatment of the second step, the nitride layer 131 containing the hard particles 122 are formed on the surface of the top face 61.

When the hard particles 122 are formed of alumina, particularly it has good chemistry with the nitriding treatment, and thus there is an advantage that the nitride layer 131 easily grows while containing the hard particles 122, and many hard particles 122 are taken into the nitride layer 131.

The nitride layer 131 formed in the second step has high hardness and excellent abrasion resistance because the base material constituting the top face 61 is nitrided. Therefore, the abrasion resistance of the top surface which slides with the air intake cam 70 at high speed is enhanced, and thus the valve lifter 6 having excellent endurance can be implemented. Furthermore, as shown in FIG. 4B, the nitride layer 131 formed in the second step contains the hard particles 122 having high hardness, and thus the enhancement of the abrasion resistance can be implemented in cooperation with the high abrasion resistance of the nitride layer 131 obtained by nitriding the base material of the valve lifter 6.

Here, the property and particle diameter of the hard particles 122 used for the surface treatment of the top face 61 will be considered.

Figure 5A:
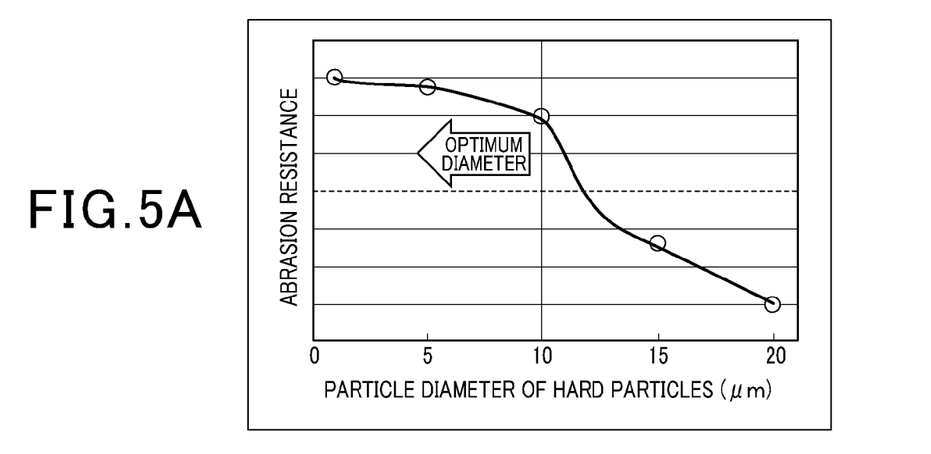
FIG. 5A shows the correlation between particle size and abrasion resistance.
Figure 5B:
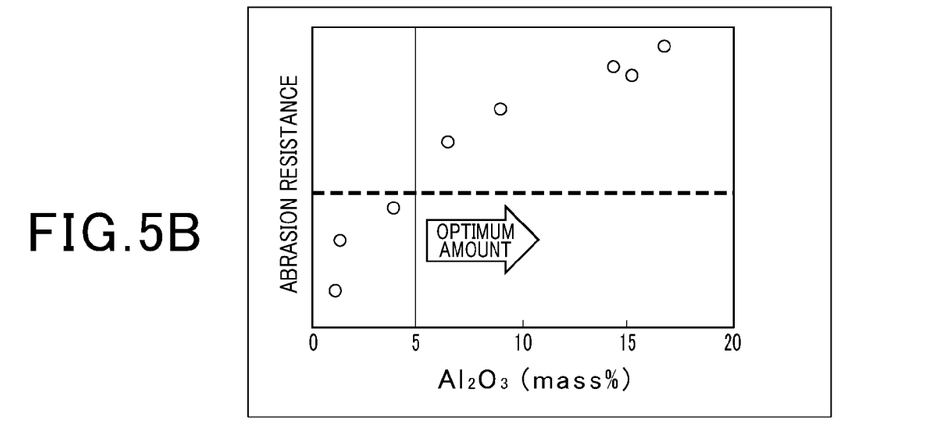
FIG. 5B shows the correlation between the density of hard particles and the abrasion resistance.

FIG. 5 is a graph showing the abrasion resistance obtained by the surface treatment according to the first embodiment, wherein FIG. 5A is a graph showing the correlation between the particle diameter and the abrasion resistance, and FIG. 5B is a graph showing the correlation between the density of the hard particles and the abrasion resistance. The data shown in FIGS. 5A and 5B are data obtained by actually conducting the surface treatment of the top face 61 according to the above method as the surface treatment method of the first embodiment.

Whether the abrasion resistance is good or not is determined by estimating a scuffing-occurring limit according to an actual machine motoring test.

FIG. 5A shows the correlation between the particle diameter and the abrasion resistance after the nitriding treatment when the surface treatment of the top face 61 was tested by using as hard particles 122 alumina which was different in particle diameter. The abscissa axis of the graph of FIG. 5A represents the particle diameter of the hard particles 122. Furthermore, the ordinate axis represents the abrasion resistance of the surface after the nitriding treatment. With respect to the test of the surface treatment, hard particles of one kind of particle diameter were used as the hard particles 122 in one test.

The test was conducted by using five kinds of hard particles of 5 μm, 10 μm, 15 μm and 20 μm in particle diameter. In the figures, values of preferable abrasion resistance are represented by a broken line. If abrasion resistance stronger than this broken line is obtained, the particle diameter would be preferable.

As a result of this test, an index value representing the abrasion resistance in the case of the particle size of an index value representing the abrasion resistance in the case of the particle size of 5 μm, and an index value representing the abrasion resistance in the case of the particle size of 10 μm were higher than a predetermined index of the abrasion resistance, and an index value representing the abrasion resistance in the case of the particle size of 15 μm and an index value representing the abrasion resistance in the case of the particle size of 20 μm were lower than the predetermined index of the abrasion resistance. That is, as shown in FIG. 5A, in the case of the particle size of 1 μm, 5 μm and 10 μm, the abrasion resistance exceeding the preferable index value was obtained. in the case of the particle size of 1 μm and 5 μm, particularly excellent abrasion resistance was obtained.

On the other hand, in the case of the particle size of 15 μm and 20 μm, the abrasion resistance after the nitriding treatment was lower than the preferable index value.

Considering this result, when the particle size is large, the hard particles 122 dispersed on the top face 61 under the state before the nitriding treatment drop out from the top face 61 before and after the nitriding treatment. Therefore, it is considered that the hard particles 122 are not sufficiently taken into the nitride layer 131, and the abrasion resistance of the nitride layer 131 formed on the top face 61 is not sufficiently enhanced.

Accordingly, the particle size of the hard particles 122 dispersed on the top face 61 before the nitriding treatment of the second step is preferably equal to 10 μm or less, and more preferably equal to 5 μm or less.

It is preferable that particles of 10 μm or less in particle diameter are dispersed on the surface of the sliding member as described above. However, when all particles to be dispersed on the surface of the sliding member are manufactured to be less than 1 μm in particle diameter, the manufacturing time is greatly increased, and this is not favorable on mass production.

In the first embodiment, large and small kinds of hard particles 122 are used. In this case, when the particle size of the hard particles 122 is preferably equal to 10 μm, more preferably 5 μm, these hard particles 122 are difficult to drop out, and easily taken into the nitriding layer 131.

Furthermore, FIG. 5B shows the correlation between the amount of the hard particles 122 dispersed on the top face 61 before the nitriding treatment and the abrasion resistance after the nitriding treatment when the test of the surface treatment of the top face 61 was executed by using alumina having a predetermined particle diameter is used as the hard particles 122.

The abscissa axis of the graph of FIG. 5B represents the index value representing the abrasion resistance obtained by the test. It is expected that the abrasion resistance is higher as the value of the abscissa axis is higher. In FIG. 5B, a preferable value of the abrasion resistance is represented by a broken line, and if a value higher than the value represented by the broken line is obtained, this would be a preferable result.

In this test, the density of the hard particles was changed by eight stages of 1%, 1.2%, 3.8%, 6.4%, 8.9%, 14.3%, 15.2% and 16.7%.

As a result, an index value representing the abrasion resistance in the case of 1%, an index value representing the abrasion resistance in the case of 1.2% and an index value representing the abrasion resistance in the case of 3.8% were lower than a predetermined index of the abrasion resistance, and an index value representing the abrasion resistance in the case of 6.4%, an index value representing the abrasion resistance in the case of 8.9, an index value representing the abrasion resistance in the case of 14.3%, an index value representing the abrasion resistance in the case of 15.2% and an index value representing the abrasion resistance in the case of 16.7% were higher than the predetermined index of the abrasion resistance. The densities in the case of 6.4%, 8.9%, 14.3%, 15.2% and 16.7% exceeded the preferable reference of the abrasion resistance represented by the broken line, and the result indicates that the abrasion resistance is reduced as the density is lower.

When respective measurement points shown in FIG. 5B are approximated and a boundary value at which preferable abrasion resistance is obtained is considered, the density of 5% is regarded as a reasonable boundary value.

As the density of the hard particles is higher, the abrasion resistance is higher. However, when hard particles having the density exceeding 20% are manufactured, the manufacturing time is greatly increased, and thus this is not favorable on mass production.

The measurement of the density of the hard particles in this test was executed by using X-ray photoelectron analyzer: ESCA-1000 produced by Shimadzu Corporation while measured at about 40 nm below the surface.

This result is reviewed. It is considered that when the density is low, the hard particles 122 cannot be sufficiently taken into the nitride layer 131 and the abrasion resistance of the nitride layer 131 formed on the top face 61 is not sufficiently high.

Accordingly, the amount of the hard particles 122 to be dispersed on the top face 61 before the nitriding treatment of the second step is preferably equal to at least 5% or more.

As described above, according to the first embodiment, the hard particles 122 are dispersed onto the top face 61 and subjected to the nitriding treatment, whereby the nitride layer 131 having high abrasion resistance containing the hard particles 122 is formed, and this can enhance the abrasion resistance of the valve lifter 6, and particularly enhance the abrasion resistance of the top face 61 of the valve lifter 6 which slides with the air intake cam 70 and to which a high load is applied in an internal combustion engine which has been recently developed to further increase in power and rotational speed. Furthermore, when particles of aluminum oxide having good chemistry with the nitriding treatment are used as the hard particles 122, the hard particles 122 are easily contained in the nitride layer 131, and the nitride layer which sufficiently contains the hard particles 122 can be easily formed on the top face 61.

Furthermore, the particle diameter of the hard particles 122 is set to 10 μm or less, whereby the unevenness of the nitride layer 131 can be suppressed and the frictional loss of the top face 61 can be reduced. Furthermore, the hard particles 122 are dispersed on the top face 61 so as to occupy the density of at least 5%, and then the nitriding treatment is conducted, thereby enhancing the abrasion resistance of the nitride layer 131.

Furthermore, the particle size of the hard particles 122 to be dispersed on the top face 61 before the nitriding treatment is preferably equal to 10 μm or less, more preferably 5 μm. Furthermore, the amount of the hard particles 122 to be dispersed on the top face 61 before the nitriding treatment is preferably equal to 5% or more in density of the top face 61.

Furthermore, according to the first embodiment, in the first step, the hard particles 121 having a large particle diameter (for example, 1 mm or more, preferably 3 mm or more) and the small hard particles 122 (10 μm or less) are used. Therefore, the nitriding treatment is conducted in the second step under the state that these small hard particles 122 adhere to the top face 61.

Therefore, there is an advantage that polishing can be efficiently and quickly performed by the large hard particles having strong cutting force in the first step, and also there is an advantage that the hard particles 122 bite into the surface layer of the top face 61 and thus the small recess portions 104 can be formed, thereby forming effective oil pits. Particularly, the projecting portions (the projecting portions 101 of FIG. 3A, etc.) existing on the top face 61 can be efficiently cut out, whereby the frictional loss when the valve lifter 6 slides with the air intake cam 70 can be reduced. Therefore, it is greatly advantageous to use the hard particles having a large particle diameter (for example, 1 mm or more, preferably 3 mm or more).

Furthermore, in the second step, the hard particles 122 are easily taken into the nitride layer 131, and thus a larger amount of hard particles can be contained in the nitride layer 131. The hard particles 122 hardly drop out from the nitride layer 131, and thus the nitride layer 131 having more excellent abrasion resistance can be formed. Furthermore, the hard particles 122 are used together with the hard particles 121 having a large particle diameter (1 mm or more), and thus the hard particles 122 are pushed into the top face 61 by the hard particles 121. Therefore, the hard particles 122 bite into the top face 61, or minute oil pits are formed. Accordingly, the sliding environment of the top face 61 can be adjusted.

As described above, by using the hard particles different in particle diameter, an excellent effect can be obtained in each of the first and second steps.

When the hard particles different in particle diameter are used as described above the particle diameter of at least the small hard particles 122 is preferably set to 10 μm or less as described above.

In the first embodiment, the mixture of the large hard particles 121 (1 mm or more) and the small hard particles 122 (10 μm or less) which are formed of alumina or the like is used in the first step. However, the present invention is not limited to this style, and for example only the large hard particles (1 mm or more) having one kind of particle diameter may be used. Even when only the large hard particles are used, the hard particles impinge against one another and come into contact with one another under pressure, and thus they are destructed/crushed, so that hard particles having a smaller particle diameter similar to the hard particles 122 occur. Therefore, even when the surface treatment of the first step is conducted by using only the large hard particles 121, the same situation as the case where the small hard particles 122 are mixed in the first embodiment is established, and thus a sufficient effect can be obtained.

Furthermore, when the surface treatments of the first step and the second step are conducted while the large hard particles 121 and the small hard particles 122 are mixed, alumina may be used for the small hard particles 122 and particles formed of any material such as metal material, synthetic rubber or the like may be used as the large hard particles 121. In this case, in the first step, the polishing is efficiently executed by the hard particles 121, and a desired surface state can be created. In the second step, the nitride layer 131 is formed while containing the small hard particles 122 formed of alumina or the like, and thus high abrasion resistance can be implemented as in the case of the first embodiment.

Second Embodiment

Subsequently, a second embodiment to which the present invention is applied will be described.

Figure 6A:
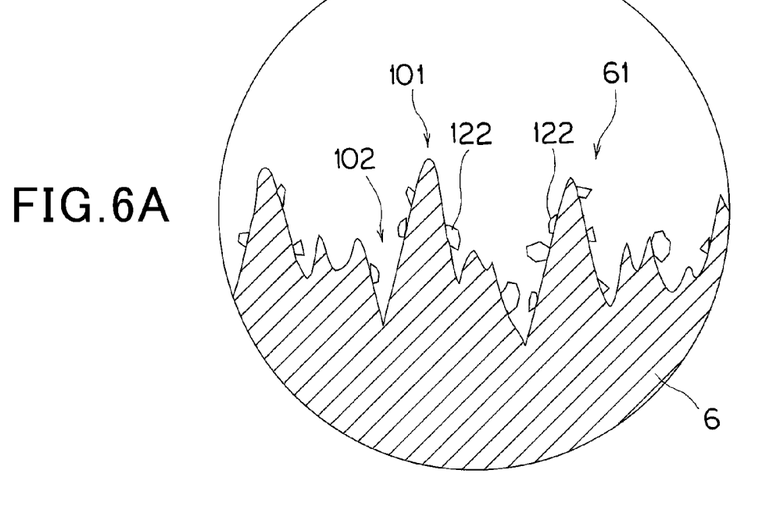
FIG. 6A is an enlarged view showing the surface state before the nitriding treatment.
Figure 6B:
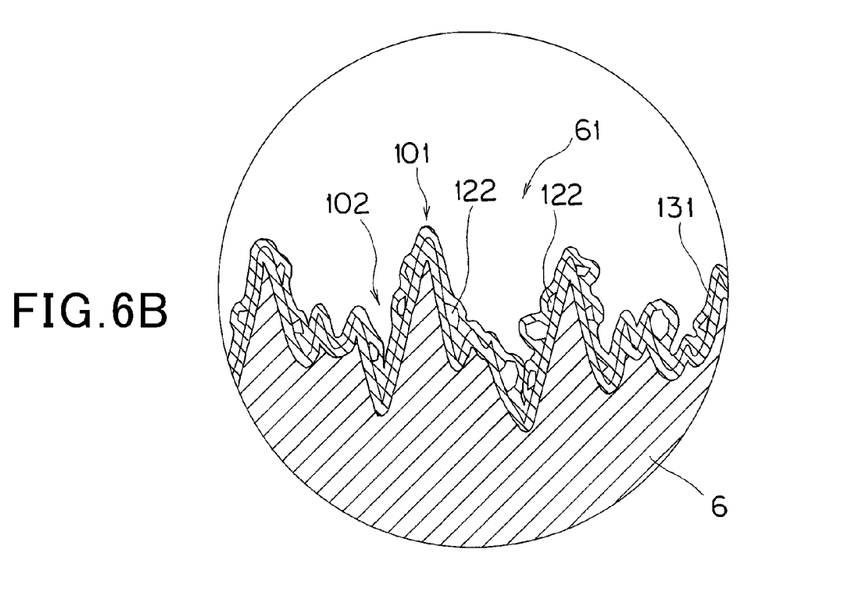
FIG. 6B is an enlarged view showing the surface after the nitriding treatment.

FIG. 6 is a schematic diagram showing an example of the surface state of the valve lifter 6 according to the second embodiment, wherein FIG. 6A is an enlarged view showing the surface state before the nitriding treatment (a second step described later), and FIG. 6B is an enlarged view showing the surface state after the nitriding treatment.

In the second embodiment, the second embodiment is identical to the first embodiment except for the surface treatment on the top face 61 of the valve lifter 6, and parts having common constructions are represented by the same reference numerals, and the illustration and description thereof are omitted.

The surface treatment of the second embodiment is conducted according to the following procedure.

First step: hard particles 122 are dispersed onto the top face 61

Second step: the top face 61 is subjected to the nitriding treatment under the state that the dispersed hard particles 122 adhere.

In the first step, the hard particles 122 are dispersed onto the top face 61 having unevenness by a method of spraying the hard particles 122 with air flow, a method of scattering the hard particles 122 from the upper side or the like. After the first step, it is preferable that the hard particles 122 adhere to the whole top face 61 containing the projecting portions 101 and the recess portions 102 as shown in FIG. 6A. Furthermore, the density of the hard particles 122 when the hard particles 122 are dispersed in the first step complies with the density described with reference to the first embodiment described above. The same is applied to the particle diameter of the hard particles 122.

The nitriding treatment of the second step is conducted on the top face 61 shown in FIG. 6A, and the nitride layer 131 is formed on the surface layer of the top face 61 as shown in FIG. 6B. The nitride layer 131 is formed in the direction from the surface layer of the top face 61 to the inside of the base material, and grows from the surface layer of the top face 61 to the outside so as to wrap the hard particles 122, thereby forming the nitride layer 131 containing the hard particles 122.

In the second embodiment, as compared with the first embodiment, the polishing based on the hard particles 121 and 122 is omitted, and thus the surface treatment can be completed in shorter time and lower cost. The nitride layer 131 formed on the surface of the top face 61 contains the hard particles 122 and has high abrasion resistance as in the case of the nitride layer 131 formed in the first embodiment, and thus the same effect as the first embodiment can be obtained.

Since the top face 61 is not polished, the projecting portions 101 and the recess portions 102 exist on the top face 61, and the smoothness is lower than that under the state shown in FIG. 4A in the first embodiment. However, when some degree of frictional loss is allowed in the top face 61, the surface treatment of the second embodiment which can bring the top face 61 with high abrasion resistance in short time and low cost is useful. Furthermore, under the state shown in FIG. 6A, the projecting portions 101 and the recess portions are emphatically illustrated. However, actually, it is possible to greatly enhance the smoothness of the top face 61 without polishing the hard particles 122. In many cases, this degree of smoothness is allowed, and thus the surface treatment method of the second embodiment is practical and useful.

Third Embodiment

Figure 7A:
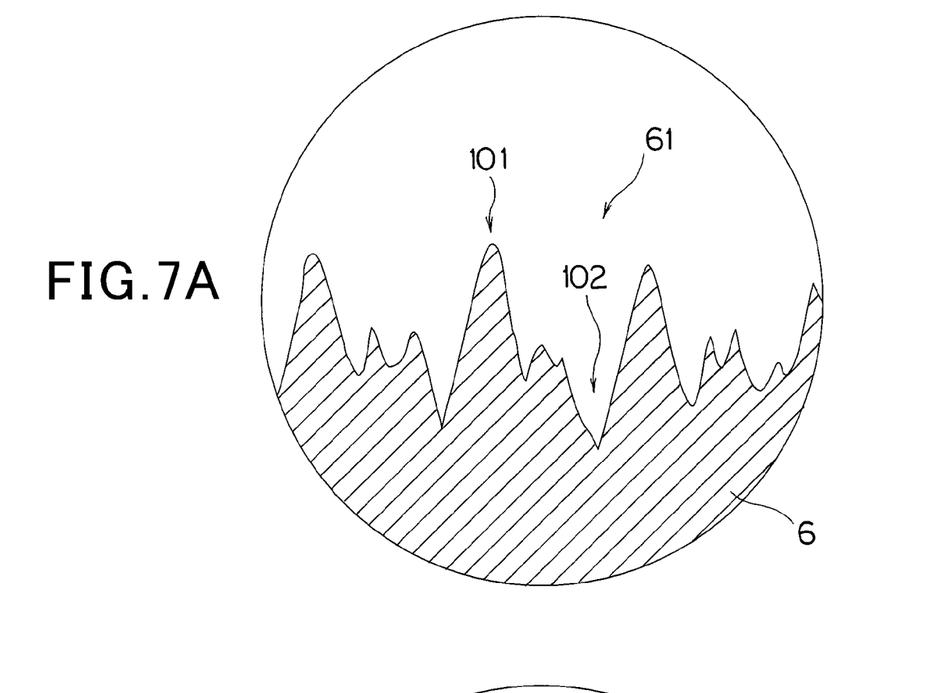
FIG. 7A is an enlarged view showing the surface state before the polishing step.
Figure 7B:
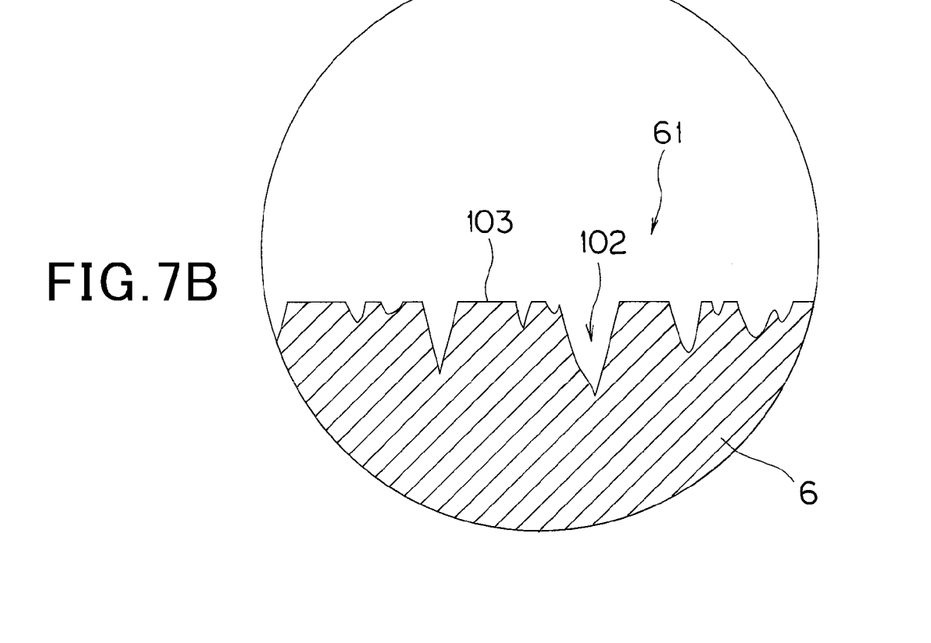
FIG. 7B is an enlarged view showing the surface state after the polishing step.
Figure 8A:
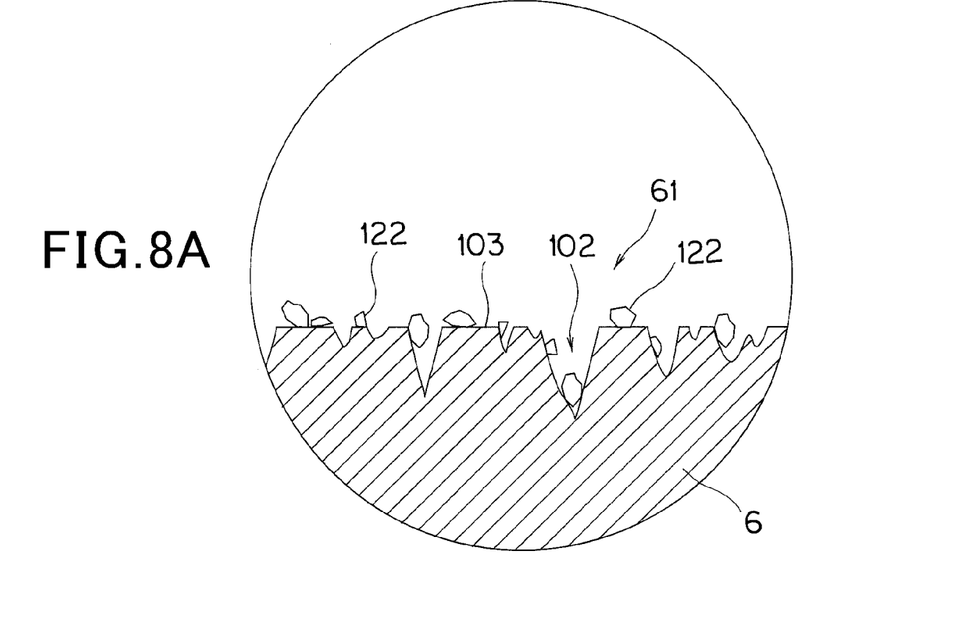
FIG. 8A is an enlarged view showing the surface state before the nitriding treatment.
Figure 8B:
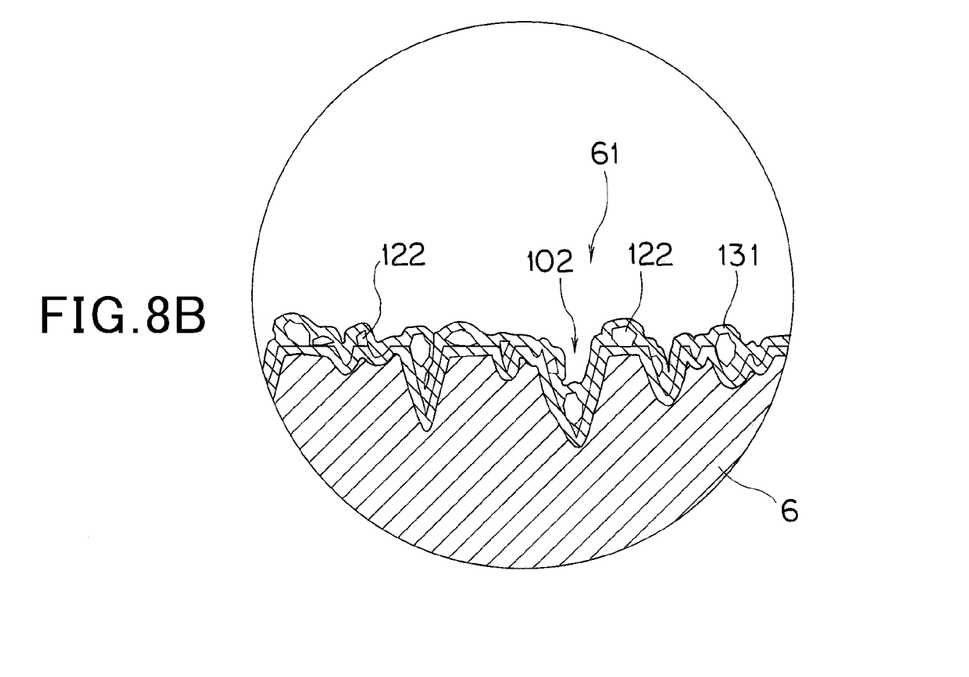
FIG. 8B is an enlarged view showing the surface state after the nitriding treatment.

FIGS. 7 and 8 are diagrams showing the surface state of the valve lifter 6 according to a third embodiment, wherein FIG. 7A is an enlarged view showing the surface state before a polishing step (first step described later), FIG. 7B is an enlarged view showing the surface state after the polishing step, FIG. 8A is an enlarged view showing the surface state before the nitriding treatment (third step described later), and FIG. 8B is an enlarged view showing the surface state after the nitriding treatment.

The third embodiment is the same as the first and second embodiments except for the surface treatment on the top face 61 of the valve lifter 6. Parts having the common constructions are represented by the same reference numerals, and the illustration and description thereof are omitted.

The surface treatment of the third embodiment is conducted according to the following procedure.

First step: the top face 61 is polished without using the hard particles 122

Second step: the hard particles 122 are dispersed on the top face 61.

Third step: the top face 61 is subjected to the nitriding treatment under the state that the dispersed hard particles 122 adhere to the top face 61

According to the surface treatment method of the third embodiment, in the first step, the top face 61 having the projecting portions 101 and the recess portions 102 shown in FIG. 7A is polished. In the polishing of the first step, the polishing is conducted without using the hard particles 122.

For example, a method using a general rotational grind stone is known as a polishing method.

Furthermore, at the time point when the polishing of the first step is finished, the top face 61 may be cleaned to remove material used for polishing.

When the polishing of the first step is finished, the top face 61 becomes a surface of high smoothness having a flat face 103.

Subsequently, in the second step, for example, hard particles 122 are dispersed onto the top face 61 by a method of spraying or scattering the hard particles 122 onto the polished top face 61. After the second step, the hard particles 122 adhere onto the whole top face 61 containing the projecting portions 101 and the recess portions 102 as shown in FIG. 8A.

In the second step, the density of the hard particles 122 when the hard particles 122 are dispersed complies with the density described with reference to the first embodiment described above. The same is applied to the particle diameter of the hard particles 122.

Under the state shown in FIG. 8A, the nitriding treatment of the third step is conducted, and the nitride layer 131 is formed on the top face 61 as shown in FIG. 8B. The nitriding layer 131 is formed in the direction from the surface layer of the top face 61 to the inside of the base material, and grows from the surface layer of the top face 61 to the outside so as to wrap the hard particles 122, thereby forming the nitride layer 131 containing the hard particles 122.

In the third embodiment, under the state that the top face 61 is polished according to a method which does not leave the hard particles 122 on the top face 61, the hard particles 122 are dispersed on the top face 61 and the nitriding treatment is conducted. Accordingly, when the top face 61 is polished, the top face 61 can be smoothed at higher level. That is, most of the hard particles 122 having higher hardness than the base material constituting the top face 61 have incisive shapes, and are excellent in cutting force. Furthermore, the smoothness is dependent on the particle diameter, and thus minute hard particles are preferably used to enhance the smoothness.

On the other hand, when polishing is executed without using particles such as the hard particles 122, for example, by a shot blast method using flexible blast as in the case of the third embodiment, the smoothness can be easily enhanced although the cutting force is lower. Furthermore, recesses (for example, the recess portions 104 shown in FIG. 4A) caused by impingement of the hard particles 122 are not formed on the top face 61.

Accordingly, according to the surface treatment method of the third embodiment, in addition to the same effect as described with reference to the first embodiment, the nitride layer 131 containing the hard particles 122 is formed under the state that the smoothness of the top face 61 is further enhanced, so that there is an advantage that enhancement of the abrasion resistance of the top face 61 can be implemented.

The above embodiments are mere embodiments of the present invention, and the present invention is not limited to the above construction.

For example, in the first to third embodiments, the illustration and description are made in the case where alumina particles having incisive shapes are used as an example of the hard particles 122. However, the present invention is not limited to this style, and particles which are shaped not to have sharp corners (for example, spherical particles) may be used as the hard particles 122. Furthermore, in the first to third embodiments, the nitriding treatment is conducted under the state that only the hard particles 122 are dispersed on the top face 61. However, the present invention is not limited to this style. In addition to the hard particles 122, particles formed of another material such as metal material, synthetic resin, synthetic rubber or the like may be made to adhere to the top face 61.

Furthermore, in the first to third embodiments, in the internal combustion engine 100, the surface treatment of the present invention is applied to the top face 61 of the valve lifter 6 which slides with the air intake cam 70 to open/close the air intake valve 3. The present invention is not limited to this style. The present invention may be applied to the peripheral surface of the air intake cam 70, and also applied to the sliding face between the exhaust cam 71 and the roller 81, the sliding face between the cam shaft 7 and the cylinder head 2 and any of various sliding faces in the internal combustion engines 100 with no limitation. Furthermore, the present invention is not limited to the internal combustion engine 100, and may be applied to any member without limitation insofar as the member has a mechanical sliding face.

The invention claimed is:

1. A sliding member for use in an internal combustion engine containing a sliding member that slides with another member, the sliding member comprising a main body and a base material that has been polished by hard particles having a higher hardness than the sliding member while the hard particles are directly dispersed on a surface of the base material having recess portions and that has been further coated with a nitride layer on the surface of the base material on which the hard particles have been directly dispersed.

2. The sliding member according to claim 1, wherein the hard particles are particles of aluminum oxide.

3. The sliding member according to claim 1 or 2, wherein the hard particles are particles having a particle diameter of 10 µm or less.

4. The sliding member according to claim 1 or 2, wherein the hard particles are dispersed on the surface so that the density of the hard particles on the surface is equal to at least 5%, and then the nitriding treatment is conducted.

5. The sliding member according to claim 1 or 2, wherein the sliding member is a valve lifter for opening/closing an engine valve.

6. The sliding member according to claim 1, wherein the base material constitutes a top face of the sliding member and is formed of an iron type material.

7. A surface treatment method for a sliding member having a sliding face that is used in an internal combustion engine and slides with another member in the internal combustion engine, the method comprising the steps of:
    polishing the sliding face of the sliding member with hard particles having higher hardness than the sliding member while dispersing and leaving the hard particles under the polishing on the sliding face of the sliding member; and
    conducting a nitriding treatment on the sliding face of the sliding member on which the hard particles are dispersed and left.

8. The surface treatment method for the sliding member according to claim 7, wherein the sliding member is a valve lifter for opening/closing an engine valve in the internal combustion engine.

* * * * *